United States Patent
Mowry

(10) Patent No.: US 7,835,755 B2
(45) Date of Patent: Nov. 16, 2010

(54) SYSTEM AND METHOD FOR ANONYMOUS TRACKING OF INDIVIDUALS

(75) Inventor: Craig P. Mowry, Southampton, NY (US)

(73) Assignee: Home Producers Network, LLC, Scottsdale, AZ (US)

( * ) Notice: Subject to any disclaimer, the term of this patent is extended or adjusted under 35 U.S.C. 154(b) by 607 days.

(21) Appl. No.: 11/513,731

(22) Filed: Aug. 30, 2006

(65) Prior Publication Data

US 2007/0111701 A1 May 17, 2007

Related U.S. Application Data

(60) Provisional application No. 60/712,489, filed on Aug. 30, 2005.

(51) Int. Cl.
*H04W 88/02* (2009.01)
(52) U.S. Cl. .................................................. 455/456.1
(58) Field of Classification Search ............. 455/414.3, 455/3.03, 456.3, 1, 3.04, 436, 448, 450, 456.1, 455/464, 509, 529; 370/312, 328–350, 432, 370/208, 211, 311
See application file for complete search history.

(56) References Cited

U.S. PATENT DOCUMENTS

| | | | | |
|---|---|---|---|---|
| 3,603,536 A | * | 9/1971 | Dochow | 244/142 |
| 4,637,577 A | * | 1/1987 | Miseyko et al. | 244/147 |
| 5,409,187 A | * | 4/1995 | Dunham | 244/149 |
| 5,816,535 A | * | 10/1998 | Underwood et al. | 244/137.3 |
| 2001/0037271 A1 | * | 11/2001 | Kubota | 705/34 |
| 2003/0093187 A1 | * | 5/2003 | Walker | 701/1 |
| 2005/0187677 A1 | * | 8/2005 | Walker | 701/16 |
| 2005/0211768 A1 | * | 9/2005 | Stillman | 235/381 |

* cited by examiner

*Primary Examiner*—Diane Mizrahi
(74) *Attorney, Agent, or Firm*—Ostrolenk Faber LLP

(57) ABSTRACT

Preferably, the invention comprises a system for eliciting information anonymously from a user. The system comprises a plurality of broadcasting units operable to communicate over a communication network, wherein each respective unit is provided with a unique and identifiable code that is identifiable by the user. Further, a dedicated broadcast reception component is included and operable to interface with at least one of the plurality of units. Moreover, an audio transmitter is provided each of the plurality of units and operable to receive and transmit information from a user. Further, the user uses at least one of the plurality of units to convey the information and further wherein the conveyed information may result in an incentive provided to the user.

9 Claims, 1 Drawing Sheet

SYSTEM AND METHOD FOR ANONYMOUS TRACKING OF INDIVIDUALS

CROSS-REFERENCE TO RELATED APPLICATION

The present application is based on and claims priority to U.S. Provisional Application Ser. No. 60/712,489, filed on Aug. 30, 2005 and entitled "TRACKING INDIVIDUALS DISPOSABLE PHONE," the entire contents of which is hereby incorporated by reference.

BACKGROUND OF THE INVENTION

1. Field of the Invention

The present invention relates generally to tracking, and, more particularly, to enabling an individual to report anonymously of the whereabouts of another individual.

2. Description of the Related Art

Rewards are often offered for information that leads to the apprehension of a wanted person, such as a fugitive and/or outlaw. By offering a reward, it is believed that people will be motivated to act as informants and/or to risk a degree of personal harm in order to collect the reward. Occasionally, rewards are significantly large, and typically correlate with the degree of danger associated with the wanted individual.

Unfortunately, potential informants are often unable to provide information leading to the apprehension or to the tracking of a wanted individual, who may be indigenous to a location, due to a substantial risk that the informant's identity will be revealed or identified by those in association with the person(s) being tracked. It is perceived that the danger, regardless of the size of the reward, is simply too high.

SUMMARY OF THE INVENTION

Accordingly, the present invention provides an easy and secure way for individuals to communicate information over a wide area. The communicating provides a very low risk endeavor, and includes incentives for individuals to communicate such that they cannot be tracked, thereby providing a fail proof way to associate a reward for useful information.

Preferably, the invention comprises a system for eliciting information anonymously from a user. The system comprises a plurality of broadcasting units operable to communicate over a communication network, wherein each respective unit is provided with a unique and identifiable code that is identifiable by the user. Further, a dedicated broadcast reception component is included and operable to interface with at least one of the plurality of units. Moreover, an audio transmitter is provided each of the plurality of units and operable to receive and transmit information from a user. Further, the user uses at least one of the plurality of units to convey the information and further wherein the conveyed information may result in an incentive provided to the user.

To meet these priorities, the present invention preferably includes selectively many (e.g., thousands) of simple, cellular units or telephones that provide very limited functionality. For example, such small units may include a single control, which when activated powers the unit "on" and then dials the necessary access number to provide information to a live person or recording system. The present invention discloses relative to the latter, though is not limited to that option.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which.

DETAILED DESCRIPTION OF EMBODIMENTS OF THE INVENTION

Figure 1:
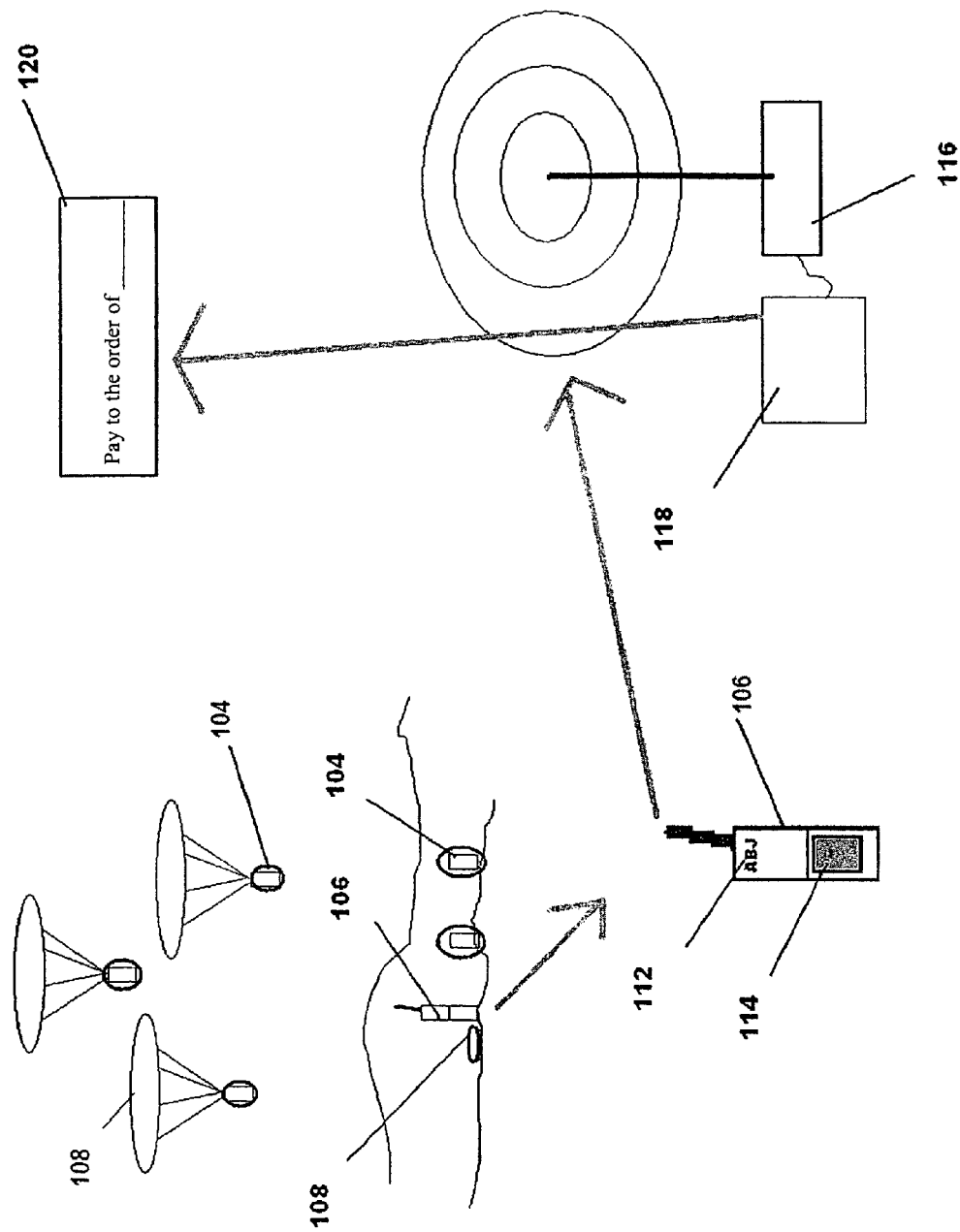
FIG. 1 illustrates various elements in accordance with a preferred embodiment, including cellular phone units, receiving station, cell tower and incentive reward.

The present invention enables persons desiring to provide information, for example, regarding the location of an individual, to do so safely and anonymously. In a preferred embodiment, the invention includes cellular telephone-like units that may be coupled with permanent or temporary cell "towers." In a preferred embodiment, the units are operable for reception and cover a geographic area where such units are disseminated. The units are preferably disseminated by air and, thereafter, micro-parachuted and distributed in packages designed to protect the units. In one embodiment, a power cord is provided in the package for use in the case of loss of battery power, and/or a battery unit is provided in the package that is capable of long term use are provided. In one embodiment, the unit deactivates and conserves energy when not engaged, in case a single unit must travel through hands and time to reach an informant of value.

The units preferably enable a person to transmit a message regarding another individual, such as that individual's physical location, and, thereafter, to collect a reward or other incentive for the information without requiring the person to keep the unit.

In one embodiment, the units are configured with a recording module that enable messages from the units to be recorded automatically (or substantially automatically, which require at least some user input) along with the Subscriber Identification Module or Subscriber Identity Module ("SIM") card data or other single unit identification of the units, or their "number." This information is the same, or corresponds to simple identification data provided in printed information with the phone, in the package dropped, and in a preferred configuration as a large printed aspect of the phone for easy reading in the language(s) native to potential informants.

Such "codes" are preferably used to identify informant's communication devices, might for example be three letters. For example, in English, three letters allow for over 15,000 such units and unique, simple identifiers.

The identifier enables an informant who makes the call to provide information which may be recorded preferably with the phone unit ID data to collect a reward or other incentive that is posted, Preferably the code is very visible on the phone unit as printed text as well, and will be used by the informant or a contact of the informant to make contact with indicated departments of the United States government (or selectively any soldiers or personnel in the field or elsewhere representing the government of USA).

The invention enables informants to be not associated with, or in possession of or linked to the phone that is used to provide critical information. The informant preferably knows the unique three letter (or other simple) code, and only the "message" received by the government that was useful or deemed to meet the criteria of the reward, would by tracking means, be associated with the unique identifier (e.g., three letter code). This code is known only by the informant or those he/she may have contacted on their behalf, after apprehension of the individual(s) being tracked, and when the situation is perhaps more safe for the informant to make contact and claim the reward.

The reward information, details of the unit and how to use the unit, cautionary notes and the three letter code might all be aspects of an audio recording played by a speaker or through an ear piece associated with the unit when activated. An initial message, for example, typed on the phone itself prompts the user to activate the phone for this information—if such information is not literally on the phone in type, and/or in some way within the overall unit dropped by air or otherwise distributed under the method.

Further, cautionary notices are preferably provided for informants to not disclose the code or write it down, unless there is a single critical contact that is safe. It is suggested that no such contact is made and no codes are disclosed until clear, press covered capture of individuals related to the program occurs, as well. This increases a likelihood of safety for the informant.

Preferably, the invention comprises special cellular (or other communication measure, including any such electronic, "Walking talkie" or other communications known or unknown publicly) is provided in the form of simple, and even "single control," or units that activate and dial simply by being "opened," for example.

The units are preferably received by special cellular or other electronic receiving towers or means, and such information provided would be recorded along with the unique number or SIM or other identifier of the unit used to provide information.

After a wanted individual(s) is/are apprehended, (or accomplishment of any task associated with the aspects of this invention or invention in total) the informant or those who represent him, or provided information on his/her behalf, (who "called,") who provide the three digit code to the authorities, those indicated in the type written on the phone or other "contact" means suggested, are entitled to the reward. The code (e.g., three letters) correspond to the useful information recorded and the phone unit used. Thus, a matching process is disclosed that links the caller's code to the information and, ultimately, the reward.

Preferably, information would be suggested to be disclosed (suggested) only to representatives of the USA, to avoid fraud and false claims for rewards. Further, such "claims" would clearly only be made after known apprehension of the individual(s) in question.

To ensure continued protection and/or safety, various reward components for a successful program include removal and relocation to, for example, the USA of family, and handling of all details, expense and logistics of such means to keep the informant and his associates/family safe and with the incentive to inform.

Through the system/method of the present invention, after many (e.g., thousands) of units have been dropped into a selected area, for example, by air or distributed by other means, local or indigenous individuals who are privy to information that they would otherwise not be safe to disclose under present means, such as by contacting USA soldiers, may provide critical location information directly or by way of an associate, avoiding known contact with any of the dropped cellular or other communications units.

Preferably, wide publicity of the units, the units' distribution, and corresponding rewards/incentives, and related issues by news and other media outlets is preferred. Once the units are dropped they have no confidential aspects anyway. Any individual who is being tracked (or his/her associates) has no ability to knowingly police whether a ten second even has occurred on any of the units. An informant simply opens the cover of a unit, provides the critical, timely information for apprehension, and disposes of the unit. The likelihood of the wanted individual becoming aware of informant is relatively low.

Referring now to FIG. 1, specifically configured cellular units 106 are provided housed in a weather protective housing and include a kit of materials 104 such as power cord to preclude empty battery issues, etc., and are dropped by air with internal parachute 109 deploying operability. The kit of materials 104 are preferably dropped within a foreign country (e.g., Pakistan or Afghanistan), and the kit of materials 104 land selectively at random over a selected area. One skilled in the art will recognize that air dropping is not be the deployment means of multiple such units however.

With potentially extremely easy usage, the "finder" of the unit is beckoned, selectively by writing or other "visible" aspects on the unit 106 or the unit's housing for example, to open the unit to learn about the incentive 120 and anonymous, danger free option to collect information.

In one embodiment, a combination of literally visible type and/or image on the unit, audio messages potentially playing automatically on a sensed approach of an individual, (optional operability of the units for example) function to reduce fear and lure the potential user to free the unit from the housing, (in an embodiment where this is not done automatically) and then to activate the unit, which in the preferred configuration is performed by lifting a familiar cell phone "cover" or making contact with the unit. All operations preferably designed to overcome the language and cultural barriers with the goal of getting the operating instructions from the unit, including the incentive 120 and procedure to provide information and receive such an incentive 120 without danger, or with minimized risk, to the provider who has been likely intimidated from attempting such information providing, even if aware of an incentive 120, due to the risk from potentially visible contact with others.

Once activated, in this configuration with an audio message and visual cues activated on a screen on the kit of materials 104 once an individual opens a plastic protective "zip lock" bag containment aspect, 108, the unit makes immediate contact with closed cellular network receiving station(s) 116, and identifies itself in a fashion similar to other known cellular units. In a preferred embodiment, a simple code or with a number that links to codes visible or provided to a user simply, by the unit during use. By code, a simple "three letter" sequence in the native language where such units may be dropped, is a good example of the simple memory based anonymous incentive system.

Preferably, the units 106 are provided without controls, such as buttons, for simplicity, and are provided with recorded information for the user to hear and see, on screen for example, and to avoid a received broadcast being necessary to provide information creating a necessity for clear transmission to the units, as opposed to transmission simply from the units 106. Unit 106 guides the user quickly and simply through the process of leaving a recorded message. Selectively, preferably radio contact is imperfect, the unit itself may record the message and continue to work automatically to get the message to home base recording and computing component 118, to allow even weak radio contact to provide means for such a unit to over time get the information it records to the reception station 116 for storage and review by personnel.

The safety aspect of the invention is provided in potential instructions related to a message provided, to distance his or herself from the unit once their message is complete. That they further need not leave name and personal information unless they choose, and that under no circumstances should they attempt contact with the indicated receiver, for example, the U.S. government, until the person they have disclosed information regarding has been apprehended and they perceive the situation as resolved and as safe as possible.

In one embodiment, after recording a message, the user replaces the unit in its protective bag 108 and, thereafter, buries the unit or hides it well, for future re-discovery and use. In this way, the actual coded unit having provided useful information will identify itself, the user will be guided through the process of providing information for the receiver to safely contact this information provider toward providing the incentive, 120.

In instances where this is not possible, such a program might allow virtually any representative, e.g., of the U.S. government who is briefed of the possibility to be aware that (s)he might be contacted by information provider(s) who are due rewards. Thus, such personnel are a part of the system/method, aware of who and how to connect the information provider with those able to identify him/her by the three digit code. As a further measure of security, the system/method may ask the information provider for a nickname provided by the unit 8 in a message, which the informant remembers. The informant is then instructed never to disclose the three digit code until the informant is in contact with a representative of the government (or other receiver) who confirms that they are the correct contact, by referring to the provider by that nickname.

Herein are aspects of the system to avoid theft of a code and incentive or disclosure of information to hostile parties acting as the correct individuals for providing incentive. In this modern age, such a provider would likely understand that re-contacting after the risk aspects have reduced, (for example after capture of a subject individual) would understand that if the phone unit itself cannot be used again, relocated etc., That internet, phone and direct contact with certain visible individuals or agencies, would all be options toward collecting the incentive.

Thus, a direct link to information collecting personnel is made between intimidated individuals, typically, who may have, or may know others who have, potentially critical information. Even thirty seconds of discreet contact with a unit, and then permanent distancing from that unit, may result in an individual safely disclosing the critical information for "capture" or other contact purpose and leave that individual with the (unwritten preferably) record for their reward, in the form of a simple memorable code, keyword, number or other aspect comprehensible to them in their own native tongue.

The arrows in FIG. 1 illustrate a sequence of events that may occur in accordance with a preferred embodiment of the invention. For example kit of materials 104 are air dropped, units 106 are used to communicate information to stations 116, and incentive 120 is provided, accordingly.

Thus, in accordance with the teachings herein, the present invention provides a simple, safe and relatively inexpensive way for informants to disclose information and receive incentives, such as rewards, therefore. Although the present invention has been described in relation to particular embodiments thereof, many other variations and modifications and other uses will become apparent to those skilled in the art. It is preferred, therefore, that the present invention be limited not by the specific disclosure herein.

What is claimed:

1. A system for eliciting information anonymously from a user and providing an incentive in exchange for the information, the system comprising:

a plurality of broadcasting units configured to communicate over a communication network, wherein each respective broadcasting unit is provided with a unique and identifiable code that is identifiable by the user;

a dedicated broadcast reception component including a computing device that is programmed and configured to interface with at least one of the plurality of broadcasting units;

a deployment container that includes a parachute for deploying one or more of the plurality of broadcasting units by air; and a respective transmitter provided with each of the plurality of broadcasting units and configured to receive and transmit information from the user;

wherein the at least one of the plurality of broadcasting units receives the information anonymously from the user, further wherein the at least one of the plurality of broadcasting units conveys, via the respective transmitter, the anonymously received information associated with the unique and identifiable code to the dedicated broadcast reception component, and further wherein the conveyed information results in the incentive being authorized to be provided to the user or a third party associated with the user after the unique and identifiable code is received from the user or the third party associated with the user, and the system matches the unique and identifiable code received from the user or the third party associated with the user with the anonymously received information.

2. The system of claim 1, further comprising cellular telephone radio technology included in the broadcasting units.

3. The system of claim 1, wherein the deployment container is further configured to contain one of the broadcasting units, and further wherein the deployment container protects the broadcasting unit during deployment of the one broadcasting unit.

4. The system of claim 1, further comprising a respective visual display provided with the broadcasting units to provide visual information to the user.

5. The system of claim 1, wherein the at least one of the broadcasting units is further configured to communicate information to the user for collecting the incentive.

6. The system of claim 1, further comprising an audio recorder provided with the at least one of the broadcasting units and configured to record information from the user.

7. The system of claim 6, wherein the at least one of the broadcasting units transmits the recorded information to the dedicated broadcast reception component.

8. The system of claim 1, wherein the transmitter is programmed and configured to receive and transmit audio information.

9. A method for providing an incentive in exchange for anonymously provided information from a user, the method comprising:

providing a plurality of broadcasting units that are each configured with a respective transmitter and configured to receive and transmit information from the user, wherein the plurality of broadcasting units are configured to communicate over a communication network;

providing a unique and identifiable code that is readily identifiable with each of the plurality of broadcasting units;
providing a deployment container that includes a parachute for deploying one or more of the plurality of broadcasting units by air;
receiving, by at least one of the plurality of broadcasting units, the anonymously provided information;
transmitting, by the at least one of the plurality of broadcasting units via the respective transmitter, the anonymously provided information with the unique and identifiable code to a dedicated broadcast reception component that is configured to interface with the broadcasting unit;
receiving the unique and identifiable code from the user;
matching the unique and identifiable code with the anonymously provided information; and
authorizing the incentive to be provided to the user or a third party associated with the user in exchange for the anonymously provided information.

* * * * *